United States Patent [19]
Sörgel

[11] Patent Number: 5,520,037
[45] Date of Patent: May 28, 1996

[54] ROLL STAND ADJUSTING METHOD

[75] Inventor: Günter Sörgel, Nürnberg, Germany

[73] Assignee: Siemens Aktiengesellschaft, München, Germany

[21] Appl. No.: 244,778

[22] PCT Filed: Nov. 26, 1992

[86] PCT No.: PCT/DE92/00989

§ 371 Date: Jun. 10, 1994

§ 102(e) Date: Jun. 10, 1994

[87] PCT Pub. No.: WO93/11886

PCT Pub. Date: Jun. 24, 1993

[30] Foreign Application Priority Data

Dec. 13, 1991 [DE] Germany .................. 41 41 230.3

[51] Int. Cl.⁶ .................................................. B21B 37/10
[52] U.S. Cl. .................. 72/8.4; 72/9.2; 72/10.3; 72/10.4
[58] Field of Search ............................. 72/8, 9, 11, 12, 72/13, 16, 20

[56] References Cited

U.S. PATENT DOCUMENTS

| | | | |
|---|---|---|---|
| 4,274,273 | 6/1981 | Fapiano et al. | 72/13 |
| 4,576,027 | 3/1986 | Yoshida et al. | 72/20 |
| 4,648,256 | 3/1987 | Wakamiya | 72/13 |
| 5,047,964 | 9/1991 | Lalli | 72/13 |

FOREIGN PATENT DOCUMENTS

| | | |
|---|---|---|
| 0008037 | 2/1980 | European Pat. Off. . |
| 4040360 | 6/1991 | Germany . |
| WO92/14563 | 9/1992 | WIPO . |

OTHER PUBLICATIONS

Siemens: *Process Automation of Hot–Strip Mills.*

Primary Examiner—Daniel C. Crane
Assistant Examiner—Ed Tolan
Attorney, Agent, or Firm—Kenyon & Kenyon

[57] ABSTRACT

Rolling schedule computing method for adjusting the desired roll force and desired roll gap of a roll stand, in which before rolling a strip (1) of a prescribed quality from an expected material hardness (MH*) and before a relative desired pass reduction ($\epsilon$*) given from a pass schedule the desired roll force (F*) is computed taking account of stand-specific and/or material-specific roll force fitting terms (KFK, KMK) and with simplification by means of a simple arithmetic combination, and then the desired roll gap (S*) is computed, with simplification by means of a simple arithmetic combination, from the desired delivered thickness (HA*) given by the relative desired pass reduction ($\epsilon$*), the stand modulus (CG) and the desired roll force (F*), taking account of a zero-point correction (SO), a temperature correction (SOT), and, as the case may be, a roll gap fitting term (KSK), and the stand (6) is subjected to the desired roll force (F*) and the desired roll gap (S*).

12 Claims, 1 Drawing Sheet

ROLL STAND ADJUSTING METHOD

This application is a 35 U.S.C. 371 of PCT/DE92/00989 filed Nov. 26, 1992.

BACKGROUND OF THE INVENTION

The invention relates to a roll stand adjusting method for adjusting the desired roll force and desired roll gap of a roll stand.

Such a method is known, for example, from the Siemens brochure "Ideas for the process automation of steel wide hot strip trains". Computing is performed according to this prior art via complex model equation systems, matching of model parameters being undertaken iteratively.

SUMMARY OF THE INVENTION

The present invention minimizes the expenditure on computing the desired roll force and desired roll gap.

Before rolling a strip of a prescribed quality from an expected material hardness and before a relative desired pass reduction given from a pass schedule, the desired roll force is computed taking account of stand-specific and/or material/specific roll force fitting terms and with simplification by means of a simple arithmetic combination, and then the desired roll gap is computed, with simplification by means of a simple arithmetic combination, from the desired delivered thickness given by the relative desired pass reduction, the stand modulus and the desired roll force, taking account of a zero-point correction, a temperature correction and, as the case may be, a roll gap fitting term, and the stand is subjected to the desired roll force and the desired roll gap.

To be specific, it has surprisingly become evident that despite the complexity of the rolling process the model equations can be linearized with sufficient accuracy. As a result, the model for computing the desired quantities becomes extremely simple, since the model equations feature only the four fundamental arithmetic operations of and no complicated functions such as, for example, logarithms or trigonometric functions.

In this case, the desired roll force and desired roll gap are advantageously computed by computing the desired roll force (F*) in accordance with the formula $$F^* = \epsilon^* \cdot MH^* \cdot KFK \cdot KMK$$

and by computing the desired roll gap (S*) in accordance with the formula $$S^* = HA^* - CG \cdot F^* + SO + SOT + KSK$$

The fitting terms of the model equations can be corrected automatically if during rolling the actual roll force, the actual roll gap and the actual rotational speed of the stand are measured, and the actual delivered thickness of the strip is determined from the actual rotational speed taking account of the forward slip, and the actual delivered thickness is compared with the actual delivered thickness expected on the basis of the model taking account of the actual roll force and the actual roll gap, and on the basis of this comparison a correction factor is computed for one of the stand-specific parameters, for example for the zero-point correction, or if during rolling the actual roll force is measured and the actual pass reduction is determined, and on the basis of these actual quantities a new stand-specific fitting term is determined and a correction factor is determined for the fitting term by means of the comparison of the newly calculated fitting term with the previously used fitting term. However, it is preferred to weight the correction factors with a confidence factor which takes account of the accuracy of the measured actual values, so that non-recurring measurement errors are not "perpetuated" in the fitting terms.

BRIEF DESCRIPTION OF THE DRAWINGS

Further advantages and details emerge from the following description of an exemplary embodiment with the aid of the drawings.

DETAILED DESCRIPTION

Figure 1:
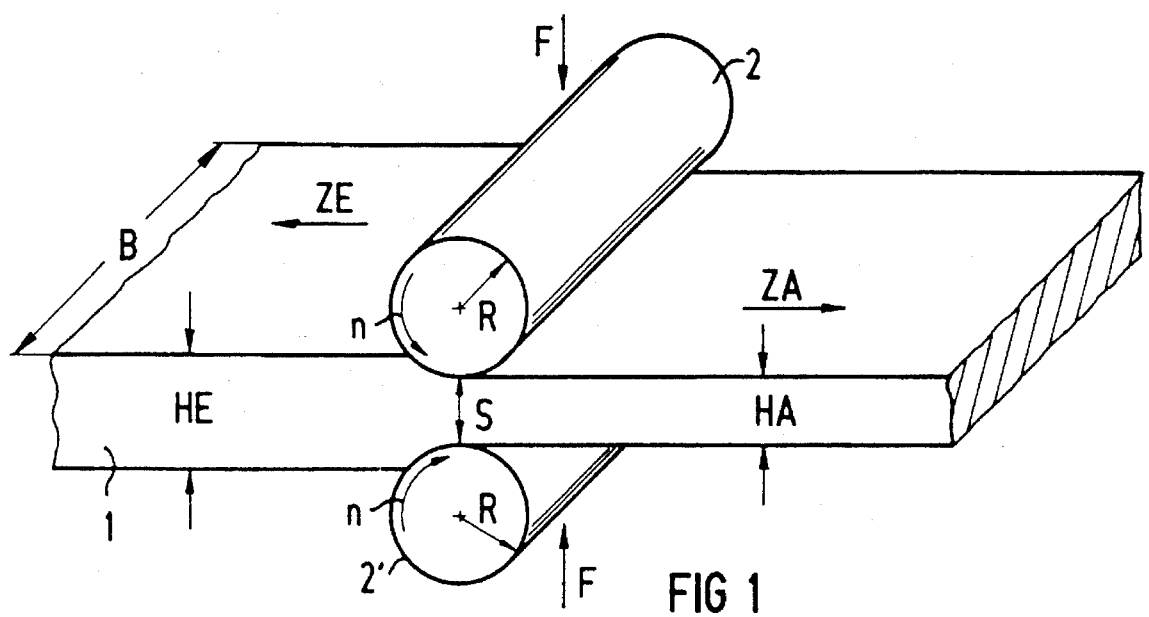
FIG. 1 shows a diagrammatic roll stand with indication of the most important quantities of rolling technology.

In accordance with FIG. 1, the aim is for a strip 1, which has a width B and is subjected on the input side to the tension ZE and on the output side to the tension ZA, to be rolled from the starting thickness HE to the desired delivered thickness HA*. For this purpose, the rolls 2, 2', whose radius is R, are subjected to the roll force F and the rotational speed n, it being the case, furthermore, that the roll gap S between the rolls 2, 2' is adjusted such that the delivery thickness HA* is set on the delivery side. The subject-matter of the present invention is the computation and stipulation of desired values for the roll force F and roll gap S.

Figure 2:
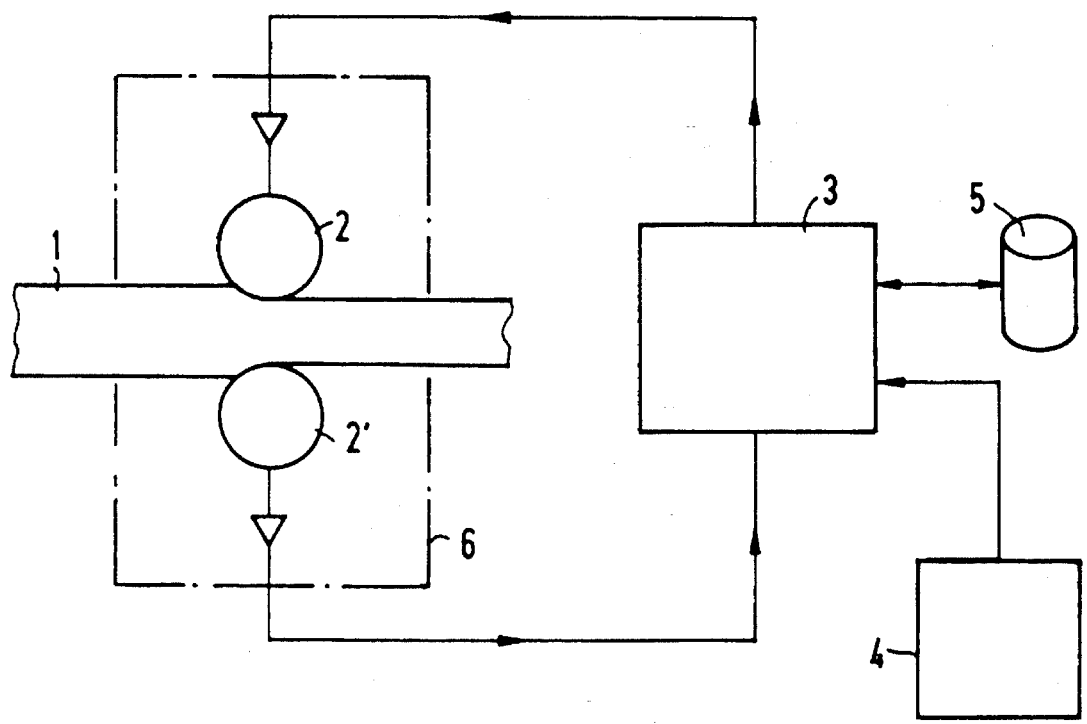
FIG. 2 shows the connection of the roll stand to the process control.

In accordance with FIG. 2, the following quantities are prescribed by the pass schedule computer 4 for the desired value computer 3:

the desired starting thickness HE*, the desired pass reduction $\epsilon^*$, the width B of the strip to be rolled the temperature T of the strip, and the desired tensions ZE, ZA on the input and output sides.

The desired delivery thickness HA* is yielded from the desired input thickness HE* and the desired pass reduction $\epsilon^*$ by means of the equation $$HA^* = (1 - \epsilon^*) \cdot HE^* \qquad (1)$$

Furthermore, the desired value computer 3 computes the expected material hardness MH* in a manner known per se from the width B and the temperature T of the strip, the radius R of the rolls, the desired pass reduction $\epsilon^*$, the desired tensions ZE*, ZA*, and the desired starting thickness HE*.

In order to compute the desired roll force F* and the desired roll gap S*, the desired value computer 3 further calls up from the memory 5 the stand-specific roll force fitting term KFK, the material-specific roll force fitting term KMK and the stand modulus CG, the zero-point correction SO and the temperature correction SOT. The terms KFK and KMK can firstly, for example, be read off from tables based on empirical values. The same holds for the stand modulus CG and the corrections SO and SOT.

The desired value computer 3 computes the desired values F* and S* for the roll force and roll gap from these quantities in accordance with the formulae $$F^* = \epsilon^* \cdot MH^* \cdot KFK \cdot KMK \qquad (2)$$

and $$S^* = HA^* - CG \cdot F^* + SO + SOT + KSK \quad (3)$$

RFK and KSK being residual error corrections which will be considered later. The stand 6 represented diagrammatically in FIG. 2 is thereupon pilot-controlled, at least during the initial pass phase, using these desired values, until the pilot control is replaced by thickness control in a manner known per se after closure of a control loop (not represented).

At least at the beginning, during rolling the actual values are continuously measured, for example every 0.2 seconds, for roll force F, roll gap S and rotational speed n of the stand 6, and stored. Because, for example due to temperature variations, the material hardness MH can vary during rolling, the measured value sequences are combined to form three groups of in each case approximately 15 measured values, the mean values and confidence intervals being computed for each measured value group or each corresponding strip segment, for example on the basis of the variance or on the basis of error estimation. The actual values used below are therefore always to be understood as mean values of a group.

The actual delivered thickness HA is determined in the form of the passage thickness from the actual rotational speed n in conjunction with the known forward slip v and the radius R.

Furthermore, the delivery thickness HA' expected on the basis of the model and of the actual quantities F, S is computed in accordance with the equation $$HA' = S + CG \cdot F - SO - SOT - KSK \quad (4)$$

A corrected value for the zero-point correction SO is then computed from the difference in accordance with the formula $$SO := SO + V \cdot (HA' - HA) \quad (5)$$

V being a confidence factor which takes account of the abovementioned measurement value inaccuracy. V has a value of at most 0.7 if all actual values can be measured exactly. The more unreliable the actual values can be measured, the smaller V becomes. In the extreme case, V can even vanish.

Furthermore, a new, corrected value for the stand-specific roll force fitting term KFK is computed on the basis of the formulae $$KFK° = F/(\epsilon \cdot MH \cdot KMK) \quad (6)$$

and $$KFK := KFK + V \cdot (KFK' - KFK) \quad (7)$$

This correction method is carried out for each of the three groups of measured values.

If the rolling mill has a plurality of stands, as is the case, for example, in a continuous cold-rolling mill, the fitting terms KFK, SO are, of course, computed separately for each stand. The material-specific roll force fitting term KMK is then corrected in accordance with the formula $$KMK := KMK \cdot KFK_m \quad (8)$$

KFKm being the mean value of the stand-specific roll force fitting term KFK of the individual stands. In this case, of course, the stand-specific roll force fitting terms KFK are divided in accordance with the formula $$KFK := KFK/KFK_m \quad (9)$$

by the mean value $KFK_m$ of the stand-specific fitting terms KFK.

The corrected values thus determined for the fitting terms KFK, KMK or the zero-point correction SO are stored in the memory 5 by the desired value computer 3. They are therefore available when a strip of this quality is to be rolled once again. If this strip, which has just been mentioned, of the same quality is rolled directly after the last-rolled strip, a roll gap fitting term KSK, by means of which a complete correction of the error occurring with the last-rolled strip is to be expected, is computed in accordance with the formulae $$F^* = \epsilon \cdot MH \cdot KFK \cdot KMK \quad (10)$$

$$S^* = HA - CG \cdot F^* + SO - SOT \quad (11)$$

$$KSK = S - S^* \quad (12)$$

In this case, however, the actual values of the measured value sequence are completely averaged before computation of the values KFK, KMK, S and HA. The fitting term KSK is set equal to 0 if a strip of different quality is being rolled.

What is claimed is:

1. A rolling schedule computing method for adjusting the desired roll force and desired roll gap of a roll stand, in which before rolling a strip of a prescribed quality from an expected material hardness (MH*) and before a relative desired pass reduction ($\epsilon^*$) given from a pass schedule, performing the steps of:

computing the desired roll force (F*) taking account of stand-specific and/or material-specific roll force fitting terms (KFK, KMK) by means of a simple arithmetic combination, and then the desired roll gap (S*) is computed, by means of a simple arithmetic combination, from the desired delivered thickness (HA*) given by the relative desired pass reduction ($\epsilon^*$), the stand modules (CG) and the desired roll force (F*), taking account of a zero-point correction (SO), a temperature correction (SOT), and, as the case may be, a roll gap fitting term (KSK).

2. The method according to claim 1, wherein the desired roll force (F*) is computed in accordance with the formula $$F^* = \epsilon^* \cdot MH^* \cdot KFK \cdot KMK$$

3. The method according to claim 1 or 2, wherein the desired roll gap (S*) is computed in accordance with the formula $$S^* = HA^* - CG \cdot F^* + SO + SOT + KSK$$

4. The method according to claim 1 wherein during rolling the actual roll force (F), the actual roll gap (S) and the actual rotational speed (n) of the stand (6) are measured, the actual delivered thickness (HA) of the strip is determined from the actual rotational speed (n) taking account of the forward slip (v), the actual delivered thickness (HA) is compared with the actual delivered thickness (HA') expected on the basis of the model taking account of the actual roll force (F) and the actual roll gap (S), and on the basis of this comparison a correction factor is computed for one of the stand-specific parameters (CG, SO, SOT), for example for the zero-point correction (SO).

5. The method according to claim 1, wherein
during rolling the actual roll force (F) is measured,
the actual pass reduction ($\epsilon$) is determined,
on the basis of these actual quantities (F, $\epsilon$) a new stand-specific fitting term (KFK') is determined, and
a correction factor is determined for the fitting term (KFK) by means of the comparison of the newly calculated fitting term (KFK') with the previously used fitting term (KFK).

6. The method according to claim 4 or 5, wherein the correction factors, weighted with a confidence factor (V), are added to the previous fitting terms, the confidence factor (V) being larger the more precisely it is possible to measure the actual values (F, S, n, HA, $\epsilon$).

7. The method according to claim 4 or 5 wherein directly after the last-rolled strip a strip of the same quality is rolled, in order to compute the desired roll force (F*) and desired roll gap (S*) for this strip, fitting terms (KFK, KMK, KSK) are determined by means of which a complete compensation of the deviation last determined between the actual delivered thickness (HA) and expected delivered thickness (HA') is to be expected.

8. The method according to claim 1 wherein, the desired values (F*, S*) are stipulated only for the start of the strip (1), and the desired value stipulation is replaced after the start of rolling by thickness control.

9. The method according to claim 4, wherein a plurality of sets of measured values are recorded per strip, and mean values and confidence intervals are computed from these measured value sets.

10. The method according to claim 9, characterized in that the computation of the mean values and of the confidence intervals is performed in groups.

11. The method according to one of claims 1, 2, 4, 5, 8, 9 or 10 wherein, it is applied in a multi-stand rolling mill, preferably in a continuous rolling mill.

12. The method according to claim 11, wherein the rolling mill is a hot-rolling mill.

* * * * *